(12) United States Patent
Tailliet

(10) Patent No.: US 11,303,118 B2
(45) Date of Patent: Apr. 12, 2022

(54) OVERVOLTAGE PROTECTION

(71) Applicant: STMicroelectronics (Rousset) SAS, Rousset (FR)

(72) Inventor: François Tailliet, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 17/165,557

(22) Filed: Feb. 2, 2021

(65) Prior Publication Data

US 2021/0242679 A1 Aug. 5, 2021

(30) Foreign Application Priority Data

Feb. 4, 2020 (FR) ........................................ 2001096

(51) Int. Cl.
*H02H 9/04* (2006.01)

(52) U.S. Cl.
CPC .................................. *H02H 9/046* (2013.01)

(58) Field of Classification Search
CPC ....... H02H 9/046; H02H 7/1252; H02M 1/32; H02M 1/08; H02M 7/219; H04B 5/0037
USPC ........................................................ 361/91.1
See application file for complete search history.

(56) References Cited

U.S. PATENT DOCUMENTS

| 7,561,404 B2 * | 7/2009 | Sells | ...................... H02J 7/0034 361/246 |
| 8,614,874 B2 * | 12/2013 | Sells | ...................... H02M 7/219 361/246 |
| 2007/0279821 A1 * | 12/2007 | Sells | ...................... H02H 7/1255 361/98 |
| 2008/0291699 A1 * | 11/2008 | Sells | ...................... H02M 7/219 363/126 |
| 2009/0168278 A1 | 7/2009 | Landry | |
| 2011/0141782 A1 * | 6/2011 | Sells | ...................... H02M 7/219 363/127 |
| 2012/0242390 A1 * | 9/2012 | Montalbo | ............. H02M 7/219 257/676 |
| 2015/0194906 A1 * | 7/2015 | Yedinak | .................. H02M 7/23 363/126 |

OTHER PUBLICATIONS

Ker, M., et al., "Capacitor-Couple ESD Protection Circuit for Deep-Submicron Low-Voltage CMOS ASIC," IEEE Transactions on Very Large Scale Integration (VLSI) Systems, Sep. 1996, 15 pages, vol. 4, No. 3, IEEE.

(Continued)

*Primary Examiner* — Dharti H Patel
(74) *Attorney, Agent, or Firm* — Slater Matsil, LLP

(57) ABSTRACT

The present disclosure relates to a device including a rectifying bridge including: a branch connected between first and second nodes; another branch including first and second MOS transistors series-connected between the first and second nodes and having their sources coupled together; a resistor connecting the gate of the first transistor to the second node; another resistor connecting the gate of the second transistor and the first node; and for each transistor, a circuit including first and second terminals respectively connected to the drain and to the gate of the transistor, and being configured to electrically couple its first and second terminals when a voltage between the first terminal of the circuit and the first terminal of the other circuit is greater than a threshold of the circuit.

20 Claims, 5 Drawing Sheets

(56) References Cited

OTHER PUBLICATIONS

Mohan, N., et al., "ESD Protection Design Methodology in Deep-Sub-micron CMOS Technologies," University of Waterloo, Course E&CE 730 (Topic 9), VLSI Quality, Reliability and Yield Engineering, Winter 2003, 47 pages, Ontario, Canada.

Vassilev, V., "MOSFET breakdown and snapback modelling for ESD protection design in the state of the art CMOS," IMEC, Jul. 2004, 15 pages, © imec 2004, Belgium.

* cited by examiner

OVERVOLTAGE PROTECTION

CROSS-REFERENCE TO RELATED APPLICATIONS

This application claims the benefit of French Application No. 20/01096, filed on Feb. 4, 2020, which application is hereby incorporated herein by reference.

TECHNICAL FIELD

The present disclosure generally relates to electronic circuits and, more particularly, to a protection against overvoltages capable of occurring between pads of such electronic circuits, particularly after an electrostatic discharge.

BACKGROUND

Wireless communication devices capable of communicating by means of electromagnetic waves, for example, by means of radio frequency waves. When an antenna of a first device receives an electromagnetic wave emitted by a second device, the power received by the antenna of the first device may be used to electrically power circuits, for example, integrated circuits, of the first device. For this purpose, the first device generally comprises a rectifying voltage bridge configured to receive a voltage available between two pads or terminals coupled to the respective ends of a conductive winding of the antenna of the first device, and to deliver a rectified power supply voltage.

However, overvoltages, for example, caused by electrostatic discharges, may occur between the two pads coupled to the respective ends of the conductive winding of the antenna. Such overvoltages are capable of deteriorating, or even of destroying, circuits of the first device coupled to at least one of the two pads, particularly the rectifying bridge which is coupled to the pads.

SUMMARY

There is a need to overcome all or part of the disadvantages of known wireless communication devices, particularly as concerns the protection of such devices against overvoltages, for example, caused by electrostatic discharges, capable of occurring between pads coupled to the respective ends of a conductive winding of an antenna.

An embodiment overcomes all or part of the disadvantages of known wireless communication devices.

An embodiment overcomes all or part of the disadvantages of known wireless communication devices, which are due to overvoltages, for example, caused by electrostatic discharges, capable of occurring between pads coupled to the respective ends of a conductive winding of an antenna of these devices.

An embodiment overcomes all or part of the disadvantages of known voltage rectifying bridges configured to rectify a voltage available between two pads coupled to the respective ends of a conductive winding of an antenna of a wireless communication device.

An embodiment provides a device comprising a rectifying bridge comprising: a first branch connected between first and second input nodes of the bridge and comprising a third output node of the bridge; a second branch comprising first and second MOS transistors series-connected between the first and second nodes, the sources of the first and second transistors being coupled to a fourth output node of the bridge; a first resistor connected between the gate of the first transistor and the second node; a second resistor connected between the gate of the second transistor and the first node; and for each of the first and second transistors, a circuit associated with the transistor and comprising a first terminal connected to the drain of the transistor and a second terminal connected to the gate of the transistor, the circuit being configured to electrically couple its first and second terminals when an absolute value of a voltage between the first terminal of the circuit and the first terminal of the other circuit is greater than or equal to an absolute value of a threshold of the circuit and the voltage has the same sign as the threshold.

According to an embodiment, each circuit is further configured to electrically isolate its first and second terminals when the absolute value of the voltage between the first terminal of the circuit and the first terminal of the other circuit is smaller than the absolute value of the threshold of the circuit and also when the voltage has a sign opposite to the sign of the threshold of the circuit.

According to an embodiment, the first branch of the bridge comprises third and fourth MOS transistors series-connected between the first and second node and each diode-assembled, the sources of the third and fourth transistors being connected to the third node.

According to an embodiment, the first, second, third, and fourth transistors have a same N or P channel.

According to an embodiment, each circuit comprises a branch comprising a first dipole with a diode function and a second dipole with a diode function coupled in anti-series, an end of the branch being connected to the first terminal of the circuit and another end of the branch being coupled to the first terminal of the other circuit.

According to an embodiment, in each circuit, the first and second dipoles are configured to block a current when the absolute value of the voltage between the first terminal of the circuit and the first terminal of the other circuit is smaller than the absolute value of the threshold of the circuit and when the voltage has a sign opposite to the sign of the threshold of the circuit, and to conduct a current when the absolute value of the voltage between the first terminal of the circuit and the first terminal of the other circuit is greater than or equal to the absolute value of the threshold of the circuit and the voltage has the same sign as the threshold.

According to an embodiment, each circuit is configured so that the conduction of the current in the first dipole of the circuit causes an electric coupling of the first and second terminals of the circuit.

According to an embodiment, in at least one of the circuits, preferably in each circuit, the other end of the branch of the circuit is connected to the second terminal of the circuit.

According to an embodiment, in the at least one of the circuits, preferably, in each circuit, the branch of the circuit comprises: fifth, sixth, and seventh nodes; a third resistor series-connected to the first dipole between the fifth node and the sixth node; and a fourth resistor connected between the sixth node and the seventh node, each circuit further comprising a transistor having a control terminal connected to the sixth node and having conduction terminals respectively connected to the fifth node and to the seventh node, a voltage drop in the fourth resistor conditioning a turning-on of the transistor.

According to an embodiment, in the at least one of the circuits, preferably in each circuit: the second dipole is connected between the first terminal of the circuit and the fifth node, the seventh node being connected to the second terminal of the circuit; or the second dipole is connected between the seventh node and the second terminal of the circuit, the fifth node being connected to the first terminal of the circuit; or the second dipole is connected between the first terminal of the circuit and the seventh node, the fifth node being connected to the second terminal of the circuit; or the second dipole is connected between the fifth node and the second terminal of the circuit, the seventh node being connected to the first terminal of the circuit.

According to an embodiment, in at least one of the circuits, preferably in each circuit, the other end of the branch of the circuit is connected to a third terminal of the circuit, the third terminal of the circuit being connected to the first terminal of the other circuit.

According to an embodiment, in the at least one of the circuits, preferably in each circuit, the branch comprises a third resistor in series with the first and second dipoles, each circuit further comprising a transistor having a control terminal connected to a terminal of the third resistor, having a first conduction terminal coupled to the first terminal of the circuit, and having a second conduction terminal coupled to the second terminal of the circuit, a voltage drop in the third resistor conditioning a turning-on of the transistor.

According to an embodiment, in the at least one of the circuits, preferably in each circuit, the second dipole is connected between the first terminal of the circuit and the first conduction terminal of the transistor, the second conduction terminal of the transistor being connected to the second terminal of the circuit.

According to an embodiment, at least one of the circuits, preferably each circuit, further comprises a third dipole with a diode function series-connected to the transistor of the circuit between the first and second terminals of the circuit, the third dipole being connected to the second terminal of the circuit and the branch of the circuit being connected between the first and third terminals of the circuit.

According to an embodiment, the first dipole is formed of a Zener diode, of an assembly of a plurality of Zener diodes connected in parallel to one another, or of an assembly of a plurality of series-connected MOS transistors, each being diode-assembled.

Another embodiment provides an integrated circuit comprising a device such as described.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various wireless communication protocols, particularly by radio frequency waves, and their implementations have not been detailed, the described embodiments being compatible with known wireless communication protocols and known implementations of such protocols. Further, the functions implemented by known devices comprising a voltage rectifying bridge coupled to two pads of the device between which a voltage to be rectified is available have not been described, the described embodiments being compatible with usual functions of such known devices.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following description, unless otherwise indicated, all the potentials and the voltages are referenced with respect to a same reference potential, typically ground GND or, in other words, a zero reference voltage.

Figure 1:
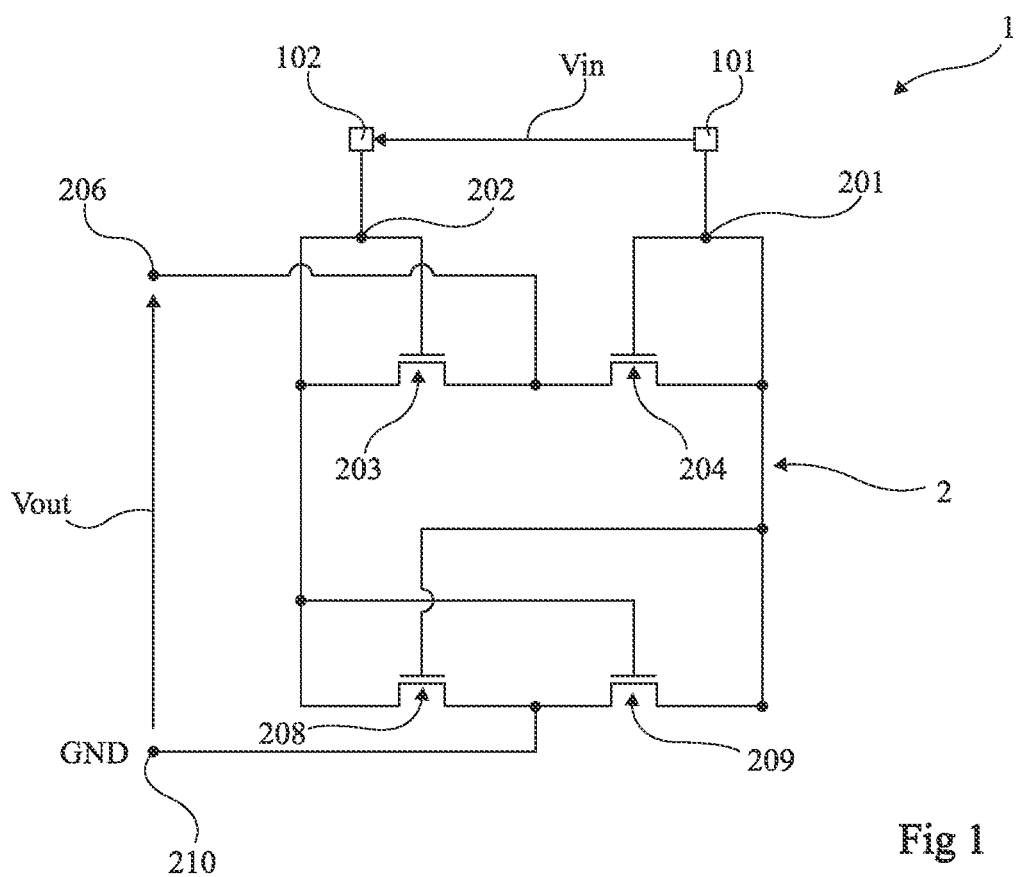
FIG. 1 illustrates, in the form of a circuit, a portion of a device comprising an example of a rectifying bridge.

FIG. 1 illustrates, in the form of a circuit, a portion of a device 1 comprising an example of a rectifying bridge 2.

In this example, device 1 is a wireless communication device comprising a conductive antenna winding, or inductance or coil, not shown, having its ends respectively connected to a pad, or terminal, 101, and to a pad, or terminal, 102 of device 1. In the following description, the case where device 1 is a radio frequency communication device, for example, a near-field communication or NFC device 1, is considered as an example.

A MOS transistor ("Metal Oxide Semiconductor") with an N channel (not shown) may be connected between pads 101 and 102, for example, to implement a function of retromodulation of an electromagnetic field received by the antenna of device of device 1. The retromodulation MOS transistor has a first conduction terminal, for example, its source, coupled, preferably connected, to pad 102, and a second conduction terminal, for example, its drain, coupled, preferably connected, to pad 101.

A capacitor (not shown) may be provided between pads 101 and 102, for example, to adjust the resonance frequency of the antenna of device 1.

FIG. 1 more particularly shows the voltage rectifying bridge 2 of device 1.

Bridge 2 is coupled to pads 101 and 102 to receive a voltage Vin to be rectified. Voltage Vin corresponds to the difference between the potential of node 102 and that of node 101, and is, in the present example, referenced with respect to node 101. As an example, voltage Vin has a maximum amplitude smaller than 6 V, for example, equal to 5.5 V (voltage Vin for example ranging from −5.5 V to +5.5 V).

Rectifying bridge 2 is configured to deliver a rectified power supply voltage Vout to circuits (not shown) of device 1. Voltage Vout corresponds to the difference between the potential of an output node 206 of bridge 2 and that of an output node 210 of bridge 2, and is, in the present example, referenced with respect to node 210. In this example, node 210 is at reference potential GND, typically the ground.

Rectifying bridge 2 comprises two nodes, or terminals, 201 and 202 coupled to respective pads 101 and 102. In the illustrated example, nodes 201 and 202 are connected to respective pads 101 and 102. According to another example, not illustrated, node 201, respectively 202, is coupled to pad 101, respectively 102, by a resistor of low value, typically a few Ohms.

Rectifying bridge 2 comprises two branches connected in parallel between input nodes 201 and 202.

One of the two branches comprises two N-channel MOS transistors 203 and 204 series-connected between nodes 201 and 202. Transistors 203 and 204 are connected to each other at the level of node 206 of bridge 2 or, in other words, each of transistors 203 and 204 is connected to node 206. Each transistor 203, 204 is diode-assembled, that is, its gate and its drain are connected to each other. In the shown example, transistor 203 has its drain and its gate connected to node 202, transistor 204 having its drain and its gate connected to node 201, and the sources of transistors 203 and 204 being connected to node 206 or, in other words, being connected together at the level of node 206.

According to another example, not illustrated, each of transistors 203 and 204 may be replaced with a diode, for example, by replacing transistor 203 with a diode having its anode connected to node 202 and having its cathode connected to node 206, and transistor 204 with another diode having its anode connected to node 201 and having its cathode connected to node 206.

The other one of the two branches of rectifying bridge 2 comprises two N-channel MOS transistors 208 and 209 series-connected between nodes 201 and 202. Transistors 208 and 209 are connected to each other at the level of the node 210 of rectifying bridge 2 or, in other words, each of transistors 208 and 209 is connected to node 210. As an example, transistor 208 has its drain connected to node 202, its source connected to node 210, and its gate connected to node 201, transistor 209 having its drain connected to node 201, its source connected to node 210, and its gate connected to node 202.

Transistors 208 and 209 have their body regions or channel-forming regions coupled, preferably connected, to node 210, to be at the potential of node 210.

In operation, when an AC voltage Vin is available between pads 101 and 102, and thus, in the present example, between nodes 201 and 202, rectifying bridge 2 delivers rectified voltage Vout. In particular, when the potential of node 202 is sufficiently greater than that of node 201, transistors 203 and 209 are on and transistors 204 and 208 are off. Conversely, when the potential of node 201 is sufficiently greater than that of node 202, transistors 203 and 209 are off and transistors 204 and 208 are on.

It is considered that an overvoltage occurs between pads 102 and 101, and thus between nodes 201 and 202, such an overvoltage for example corresponding to an increase in the potential of pad 102 with respect to that of pad 101, or positive overvoltage. A positive overvoltage for example results from an electrostatic discharge on pad 102, for example, an electrostatic discharge of 1.5 kV, or even 2 kV, according to the human body model or HBM. Such an electrostatic discharge is for example caused by a person touching pad 102 or the conductive antenna winding of device 1 which is coupled to pad 102.

Such a positive overvoltage between pads 102 and 101 causes the flowing of a significant current, for example, of at least 1 A, between pads 102 and 101, for example, a positive current flowing from pad 102 to node 210 via transistor 208, and from node 210 to pad 101 via the forward-biased diode between the substrate (body) and the drain of transistor 209.

Since the gate and the source of transistor 208 are substantially at the same potential, that is, that of node 210, transistor 208 should be off. However, when the potential difference between the drain and the source of MOS transistor 208 exceeds a threshold, called snapback threshold, the parasitic bipolar transistor of MOS transistor 208 starts conducting and a current flows from the drain to the source of MOS transistor 208. Such a current then flows to node 201, via the forward diode between the body (substrate) region and the drain of transistor 209. The conduction of the current between the drain and the source of transistor 208 has, between the conduction terminals of transistor 208, a negative differential impedance, which raises an issue.

An example of such an issue arises when MOS transistor 208 is implemented by means of a plurality of elementary MOS transistors connected in parallel. Indeed, due to manufacturing dispersions, the snapback threshold of a first one of these elementary transistors may be lower than that of all the other elementary transistors. As a result, the turning-on of the parasitic bipolar transistor of the first elementary MOS transistor occurs before the turning-on of the parasitic bipolar transistors of the other elementary MOS transistors. All the current flowing through MOS transistors 208 then flows through the first elementary MOS transistor, which may result in a deterioration, or even in a destruction, of the first elementary MOS transistor.

Although this is not detailed, the problems illustrated hereinabove in relation with transistor 208 during a positive overvoltage between pads 102 and 101 are posed in symmetrical fashion for transistor 209 during an overvoltage between pads 102 and 101 corresponding to an increase in the potential of node 201 with respect to the potential of node 202, or negative overvoltage.

To overcome all or part of the disadvantages of rectifying bridge 2, the inventor here provides associating, with each of transistors 208 and 209, a so-called turn-on circuit, having first and second terminals respectively connected to the drain and to the gate of the transistor 208 or 209 having the circuit associated therewith. Further, a resistor is connected between the gate of transistor 208 and node 201 (drain of transistor 209), another resistor being connected between the gate of transistor 209 and node 202 (drain of transistor 208).

Each of the turn-on circuits is configured to electrically couple its first and second terminals when a voltage between its first terminal and the first terminal of the other circuit is greater than or equal to a threshold of the circuit. In other words, a first one of the turn-on circuits associated with transistor 208 is configured to electrically couple its first and second terminals when the voltage between its first terminal (drain of transistor 208-node 202) and the first terminal (drain transistor 209-node 201) of the second turn-on circuit associated with transistor 209 exceeds the threshold of the first circuit, the second circuit being configured to electrically couple its first and second terminals when the voltage between its first terminal and the first terminal of the first circuit exceeds the threshold of the second circuit. The exceeding of the considered turn-on threshold by the voltage between the first terminal of this circuit and the first terminal of the other circuit is indicative of an overvoltage between nodes 201 and 202.

Further, each of the turn-on circuits is configured to electrically isolate or decouple its first and second terminals from each other when the voltage between the first terminal of the circuit and the first terminal of the other circuit is smaller than the threshold of the circuit. In other words, the first circuit is configured to electrically isolate its first and second terminals when the voltage between its first terminal and the first terminal of the second circuit is smaller than the threshold of the first turn-on circuit, the second circuit being configured to electrically isolate its first and second terminals when the voltage between its first terminal and the first terminal of the first circuit is smaller than the threshold of the second circuit. Thus, in the absence of an overvoltage between nodes 201 and 202, the operation of the rectifying bridge is not modified by the presence of the turn-on circuits and operates similarly to the rectifying bridge 2 described in relation with FIG. 1.

In the following description and in the claims, the term dipole with a diode function designates a component or a circuit having two terminals between which the component or circuit behaves as a diode. One of the terminals of the dipole is called cathode of the dipole and the other terminal of the dipole is called anode of the dipole. The dipole has, between its anode and its cathode, the same behavior as that that a diode would have between its anode and its cathode, respectively.

According to an embodiment, each turn-on circuit comprises a branch comprising a first dipole with a diode function and a second dipole with a diode function coupled in anti-series, an end of this branch being connected to the first terminal of the turn-on circuit and another end of the branch being coupled to the first terminal of the other turn-on circuit. The term branch comprising first and second dipoles with a diode function coupled in anti-series designates the case where, in the branch, the first and second dipoles have their anodes coupled together, or have their cathodes coupled together.

According to an embodiment, each turn-on circuit comprises a third terminal connected to the first terminal of the other circuit. In such an embodiment, in each turn-on circuit, the branch comprising the first and second dipoles in anti-series is connected between the first and third terminals of the circuit or, in other words, one end of the branch is connected to the first terminal of the circuit and another end of the branch is connected to the third terminal of the circuit.

According to another embodiment, in each turn-on circuit, the branch comprising the first and second dipoles in anti-series is connected between the first and second terminals of the circuit or, in other words, one end of the branch is connected to the first terminal of the circuit and another end of the branch is connected to the second terminal of the circuit.

According to an embodiment, in each turn-on circuit, the first and second dipoles are configured to block a current when the voltage between the first terminal of the circuit and the first terminal of the other circuit is smaller than the threshold of the circuit.

According to an embodiment, in each turn-on circuit, the first and second dipoles are further configured to conduct a current when the voltage between the first terminal of the circuit and the first terminal of the other circuit is greater than or equal to the threshold of the circuit.

According to an embodiment, each turn-on circuit is configured so that the conduction of a current in the first dipole of the circuit causes an electric coupling of the first and second terminals of the circuit.

According to an embodiment, in each turn-on circuit, a forward turn-on threshold of the second dipole and a reverse turn-on threshold of the first dipole at least partly determine the threshold of the turn-on circuit. The term forward turn-on threshold of a dipole with a diode function designates a value of the voltage of the dipole anode, referenced with respect to the dipole cathode, above which the dipole conducts a positive current from its anode to its cathode. Similarly, the term reverse turn-on threshold of a dipole with a diode function designates a value of the voltage of the dipole cathode, referenced with respect to the dipole anode, above which the dipole conducts a positive current from its cathode to its anode.

Figure 2:
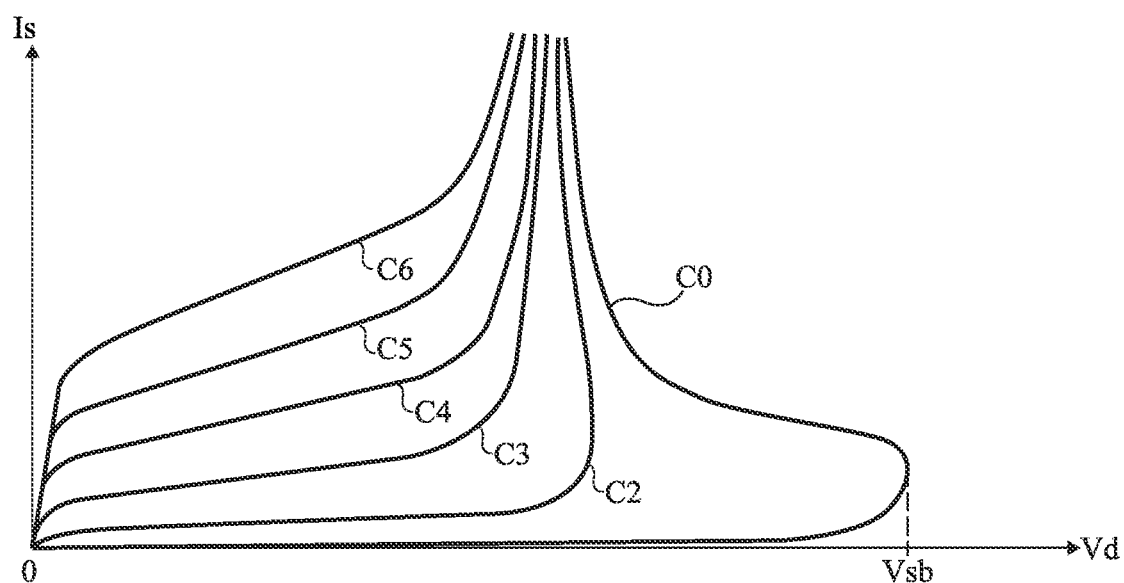
FIG. 2 shows a plurality of curves illustrating different MOS transistor turn-on operations.

FIG. 2 shows curves C0, C2, C3, C4, C5, and C6 illustrating different turn-on occurrences of a MOS transistor, in this example, with an N channel. Each curve illustrates the variation of a current Is between the drain and the source of the transistor when the source of the transistor is at ground GND and the potential Vd of the transistor drain increases. Each curve corresponds to a different potential applied to the transistor gate.

Curve C0 of FIG. 2 illustrates the case where the potential applied to the transistor gate is zero or, in other words, is equal to ground potential GND. When the drain potential Vd of the transistor increases beyond the transistor snapback threshold Vsb, the transistor then has, between its conduction terminals, a negative differential impedance. More particularly, as long as potential Vd is below threshold Vsb, current Is is zero or next to zero. Further, after potential Vd has reached threshold Vsb, a non-zero current Is flows through the transistor, current Is increasing at the same time as potential Vd decreases due to the negative differential impedance of the transistor.

Curves C2, C3, C4, C5, and C6 illustrate cases where the potential applied to the transistor gate is non-zero, this potential being higher for curve C3 than for curve C2, higher for curve C4 than for curve C3, higher for curve C5 than for curve C4, and higher for curve C6 than for curve C5.

It can be observed that for the case of curve C2, the considered transistor still has a negative differential impedance, that is, the curve has a portion where current Is increases while potential Vd decreases but the value of the negative impedance is smaller than in the case of curve C0. For the case of curves C3, C4, C5, and C6, such a negative differential impedance is suppressed.

It can further be observed that the higher the potential on the gate of the transistor, the lower the maximum value that potential Vd can take.

It can also be observed that the higher the potential on the transistor gate, the higher the value of current Is for a given potential value Vd.

Thus, the provision of turn-on circuits associated with respective transistors 208 and 209 enables, during an overvoltage between nodes 201 and 202 causing an increase in the drain potential of one of the transistors, the turn-on circuit associated with the transistor to cause a corresponding increase of the gate potential of the transistor. As a result, the transistor then operates as illustrated by curves C3, C4, C5, and C6 and no longer has a negative differential impedance. Further, for a given drain potential, the higher the gate potential of this transistor will be during an overvoltage between nodes 201 and 202, the higher the current Is flowing between the conduction terminals of the transistor, thus allowing a more efficient protection against the overvoltage.

Several embodiments and variations of turn-on circuits will now be described in relation with FIGS. 3 to 6.

Figure 3:
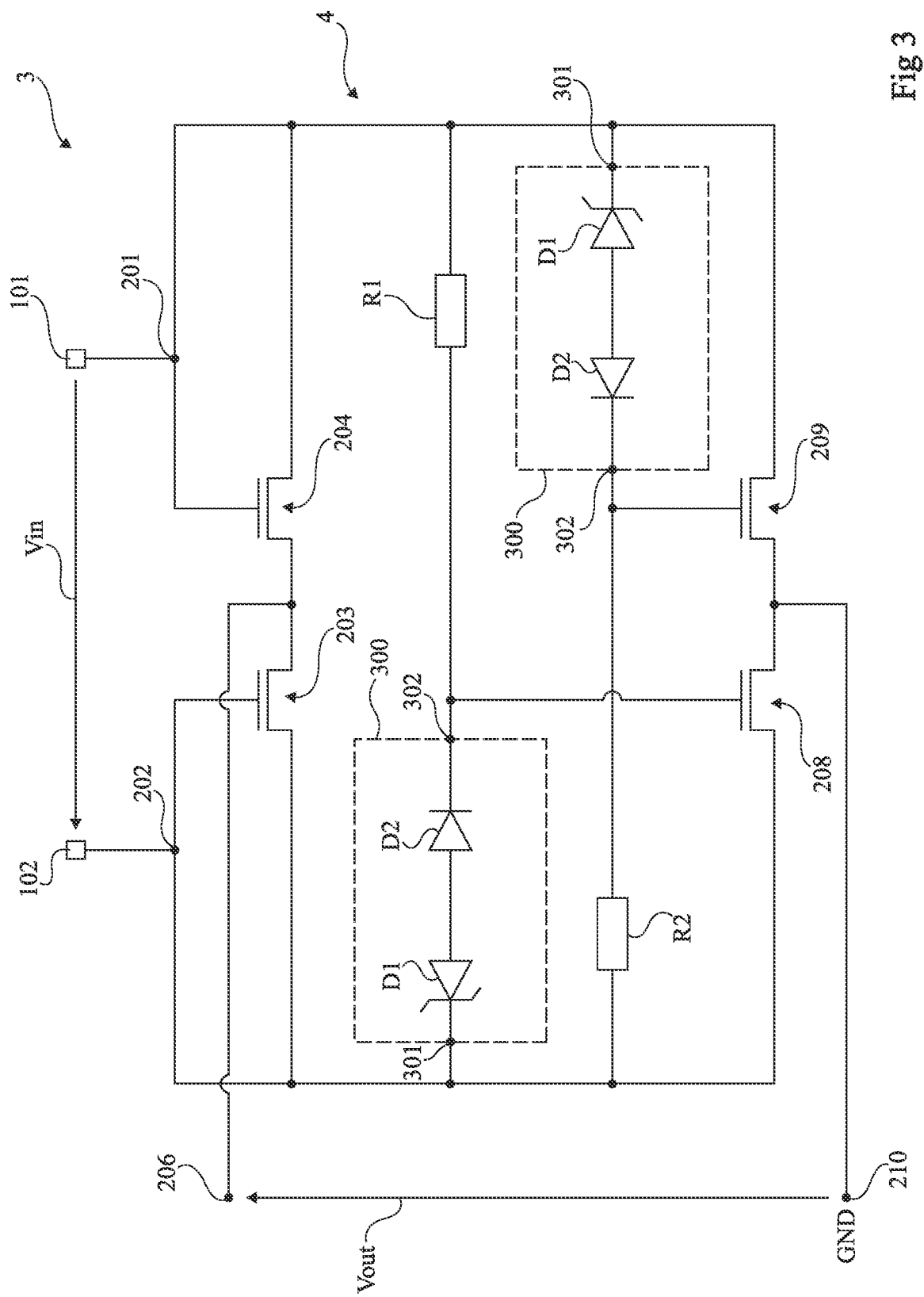
FIG. 3 illustrates, in the form of a circuit, a portion of a device comprising a rectifying bridge according to an embodiment.

FIG. 3 illustrates, in the form of a circuit, a portion of a device 3 comprising a rectifying bridge 4 provided with turn-on circuits according to an embodiment.

Device 3 is similar to the device 1 of FIG. 1, only the differences between devices 1 and 3 being here detailed.

More particularly, device 3 differs from device 1 by its voltage rectifying bridge 4, different from voltage rectifying bridge 2. As compared with rectifying bridge 2, rectifying bridge 4 comprises a resistor R1 connected between node 201 and the gate of transistor 208, and a resistor R2 connected between node 202 and the gate of transistor 209. Rectifying bridge 4 further differs from rectifying bridge 2 in that it comprises, for each of transistors 208 and 209, a turn-on circuit 300 associated with the transistor. Each circuit 300 comprises a first terminal 301 and a second terminal 302. The circuit 300 associated with transistor 208, respectively 209, has its terminal 301 connected to the drain of transistor 208, respectively 209, and its terminal 302 connected to the gate of transistor 208, respectively 209.

Each circuit 300 comprises a branch comprising a first dipole with a diode function D1 and a second dipole with a diode function D2 coupled together in anti-series.

In the embodiment illustrated in FIG. 3, in each circuit 300, the branch comprising dipoles D1 and D2 in anti-series is connected between terminals 301 and 302 of the circuit or, in other words, has one end connected to the terminal 301 of circuit 300 and another end connected to the terminal 302 of circuit 300.

In the example of FIG. 3, in each circuit 300, dipoles D1 and D2 have their cathodes connected together and their anodes connected to terminals 301 and 302, respectively. In another example, not shown, in each circuit 300, dipoles D1 and D2 have their anodes connected together and their cathodes connected to terminals 301 and 302, respectively.

The normal operation of bridge 4, that is, in the absence of an overvoltage between nodes 201 and 202, is the following. Due to the absence of an overvoltage between nodes 201 and 202, the voltage between nodes 202 and 201 (voltage of node 202 referenced to node 201) is smaller than the threshold of the circuit 300 associated with transistor 208, and the voltage between nodes 201 and 202 (voltage of node 201 referenced to node 202) is smaller than the threshold of the circuit 300 associated with transistor 209. The dipoles D1 and D2 of the circuit 300 associated with transistor 208, respectively 209, then block the flowing of a current between the terminals 301 and 302 of the circuit associated with transistor 208, respectively 209, and through resistor R1, respectively R2. As a result, the potential of node 202, respectively 201, is present on the gate of transistor 209, respectively 208.

More particularly, in the example of FIG. 3, when the potential of node 202 is greater than the potential of node 201, the dipole D2 of the circuit 300 associated with transistor 209 is reverse biased and is equivalent to an open circuit. Further, the dipole D1 of the circuit 300 associated with transistor 208 is also reverse-biased, but the voltage thereacross is smaller than its reverse turn-on voltage, whereby dipole D2 is equivalent to an open circuit. Further, as soon as the voltage between node 202 and node 201 becomes greater than the threshold voltage of transistor 209, the latter switches to the on state and electrically couples node 201 to node 210, transistor 208 being in the off state.

The normal operation of bridge 4 when the potential of node 201 is greater than that of node 202 can be deduced, by symmetry, from the above-described operation.

The operation of bridge 4 during an overvoltage between nodes 201 and 202 is the following. The case of a positive overvoltage is considered as an example. Transistor 209 and its associated circuit 300 then behave as in normal operation or, in other words, the circuit 300 associated with transistor 209 is equivalent to an open circuit between its terminals 301 and 302, and transistor 209 is on. Further, as soon as the voltage between node 202 and node 201 becomes greater than the threshold of the circuit 300 associated with transistor 208, a current flows through dipoles D1 and D2 of the circuit and through resistor R1. As a result, the gate potential of transistor 208 increases with the potential of node 202. In other words, the potential on the gate of transistor 208 is then equal to the potential of node 202 minus the voltage drop in the dipoles D1 and D2 of the circuit 300 associated with transistor 208. In the example of FIG. 3, the threshold of each circuit 300 is equal to the sum of the reverse turn-on threshold of dipole D1 and of the forward turn-on threshold of dipole D2.

The operation of bridge 4 in case of a negative overvoltage between nodes 201 and 202 can be deduced, by symmetry, from the operation described hereinabove in case of a positive overvoltage.

Figure 4:
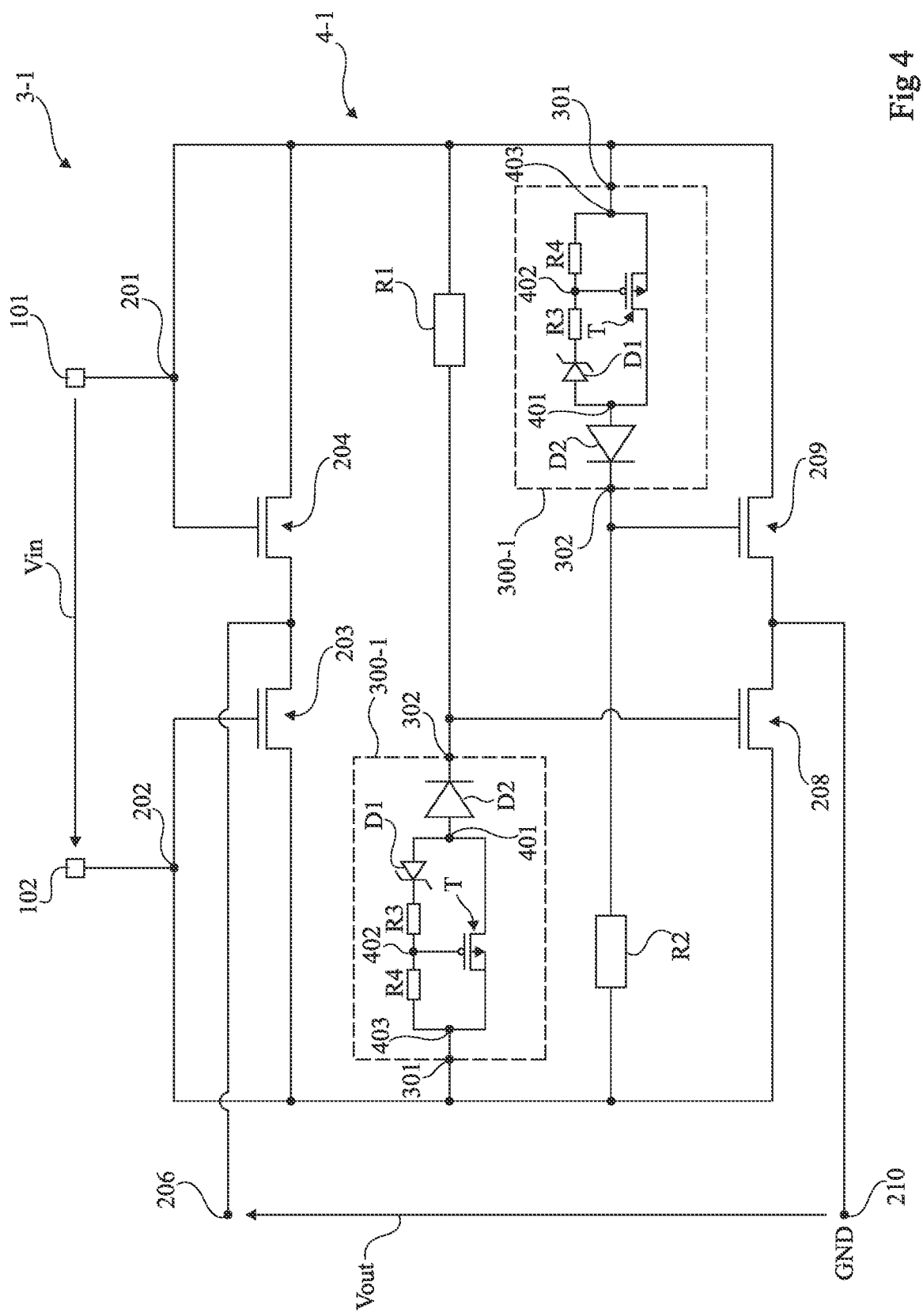
FIG. 4 illustrates in the form of a circuit a portion of a device comprising a rectifying bridge according to another embodiment.

FIG. 4 illustrates, in the form of a circuit, a portion of a device 3-1 comprising a rectifying bridge 4-1 according to another embodiment.

Device 3-1 is similar to the device 3 of FIG. 3, only the differences between devices 3-1 and 3 being here detailed. More particularly, device 3-1 differs from device 3 by its voltage rectifying bridge 4-1, different from voltage rectifying bridge 4, rectifying bridge 4-1 comprising a turn-on circuit 300-1 instead of each circuit 300 of rectifying bridge 4. Each circuit 300-1 comprises a first terminal 301 and a second terminal 302. The circuit 300-1 associated with transistor 208, respectively 209, has its terminal 301 connected to the drain of transistor 208, respectively 209, and its terminal 302 connected to the gate of transistor 208, respectively 209.

Each circuit 300-1 comprises a branch comprising a first dipole with a diode function D1 and a second dipole with a diode function D2 coupled together in anti-series.

In the embodiment illustrated in FIG. 4, in each circuit 300-1, the branch comprising dipoles D1 and D2 in anti-series is connected between terminals 301 and 302 of the circuit. In each circuit 300-1, the branch comprising dipoles D1 and D2 in anti-series further comprises a resistor R3 series-connected to the first dipole D1 between node 401 and a node 402, and a resistor R4 connected between node 402 and a node 403. Each circuit 300-1 further comprises a transistor T having a control terminal connected to node 402 and having conduction terminals respectively connected to terminals 401 and 403. Each circuit is configured so that a voltage drop in its resistor R4 conditions a turning-on of its transistor T.

According to an embodiment, as illustrated in FIG. 4, in each circuit 300-1, transistor T is a P-channel MOS transistor, the source and the drain of transistor T then being coupled, preferably connected, to nodes 403 and 401, respectively. Preferably, the body region of transistor T is coupled to the source of transistor T, so that the body and source regions of transistor T are at the same potential.

In an alternative embodiment, not illustrated, in each circuit 300-1, transistor T is replaced with a PNP bipolar transistor having its base forming a control terminal of the transistor and connected to node 402, having its emitter connected to node 403, and having its collector connected to node 401.

According to an embodiment, as illustrated in FIG. 4, in each circuit 300-1, dipole D2 is connected between node 401 and the terminal 302 of circuit 300-1. More particularly, in the present example, the cathode of dipole D2 is connected to the terminal 302 of circuit 300-1. Node 403 is then, in the present example, connected to terminal 301. In an alternative embodiment, not illustrated, in each circuit 300-1, dipole D2 is connected between terminal 301 and the node 403 of circuit 300-1. More particularly, the anode of dipole D2 is for example connected to the terminal 301 of circuit 300-1, node 401 being for example connected to terminal 302.

The normal operation of bridge 4-1 is similar to that of the previously-described bridge 4 (FIG. 3). In particular, in each circuit 300-1, when no current flows through the dipoles D1 and D2 of circuit 300-1, the voltage across resistor R4 is zero, and transistor T is off. Thus, no current flows between the terminals 301 and 302 of circuits 300-1, nor through resistors R1 and R2.

The operation of bridge 4 during an overvoltage between nodes 201 and 202 is the following. The case of a positive overvoltage is considered as an example. As in normal operation, the circuit 300-1 associated with transistor 209 is equivalent to an open circuit between its terminals 301 and 302, and transistor 209 is on. Further, as soon as the voltage between node 202 and node 201 becomes greater than the threshold of the circuit 300-1 associated with transistor 208, a current flows through dipoles D1 and D2 and through the resistors R3 and R4 of the circuit. As soon as the voltage drop in resistor R4 is greater than the threshold voltage of transistor T, the latter turns on and a current flows between nodes 403 and 401, not only via resistor R4 and R3 and dipole D1, but also via transistor T. Thus, as soon as the voltage between node 202 and node 201 becomes greater than the threshold of circuit 300-1 associated with transistor 208, the gate potential of transistor 208 increases with the potential of node 202. In particular, once the transistor T of circuit 300-1 is conductive, the potential on the gate of transistor 208 is equal to the potential of node 202 minus the threshold voltage of transistor T, the voltage drop in resistor R3, and the voltage drop in the dipoles D1 and D2 of circuit 300-1.

In the example of FIG. 4-1, the threshold of each circuit 300-1 is equal to the sum of the reverse turn-on threshold of dipole D1 and of the forward turn-on threshold of dipole D2. Further, in each circuit 300-1, transistor T switches to the on state when the voltage between terminals 301 and 302 of the circuit exceeds the sum of the reverse turn-on threshold of dipole D1, of the forward turn-on threshold of dipole D2, and of the threshold voltage of transistor T.

The operation of bridge 4-1 in case of a negative overvoltage between nodes 201 and 202 can be deduced, by symmetry, from the operation described hereinabove in case of a positive overvoltage.

An advantage of a circuit 300-1 over a circuit 300 is that it enables to conduct, once its transistor T is on, a greater current between its terminals 301 and 302, whereby the potential on the gate of transistor 208 or 209 associated therewith is higher.

Another advantage of circuit 300-1 over a circuit 300 is that, once the transistor T of the circuit is on, the current in dipole D1 is smaller. This is particularly advantageous when dipole D1 is not configured to conduct a significant current and/or when the internal resistor of dipole D1 is high.

Although this is not shown in FIG. 4, in each circuit 300-1, a frequency compensation capacitor may be provided between nodes 401 and 403 and/or a frequency compensation capacitor may be provided between nodes 401 and 402. Such capacitors allow a faster response of circuit 300-1 in case of an overvoltage. However, the value of each of these capacitors is preferably selected to be relatively low, for example, lower than 1 pF, to avoid disturbing the operation of bridge 4-1 in the absence of an overvoltage between pads 101 and 102.

Figure 5:
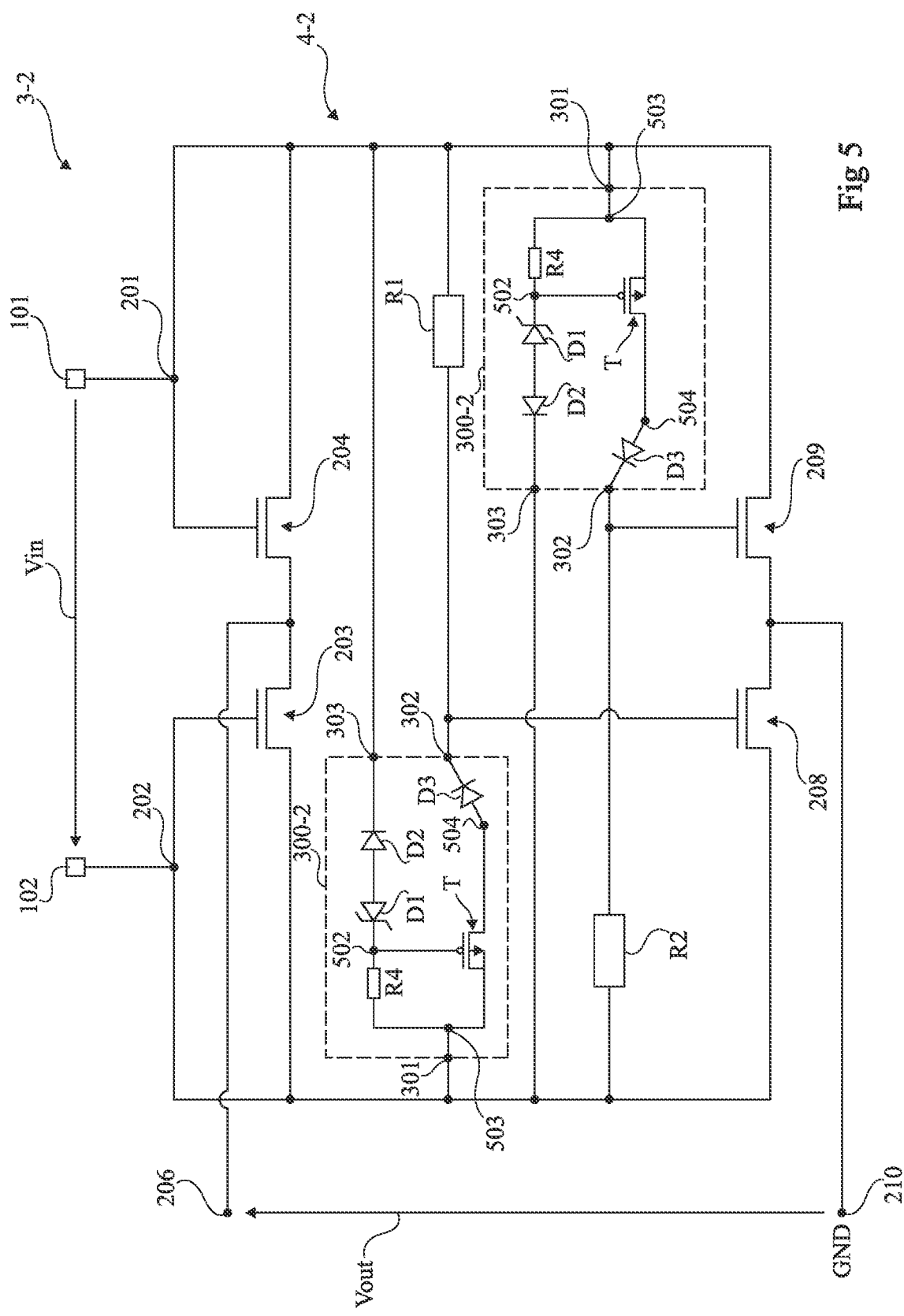
FIG. 5 illustrates in the form of a circuit a portion of a device comprising a rectifying bridge according to still another embodiment.

FIG. 5 illustrates, in the form of a circuit, a portion of a device 3-2 comprising a rectifying bridge 4-2 according to still another embodiment.

Device 3-2 is similar to the device 3-1 of FIG. 4, only the differences between devices 3-2 and 3-1 being here detailed. More particularly, device 3-2 differs from device 3-1 by its voltage rectifying bridge 4-2, rectifying bridge 4-2 comprising a turn-on circuit 300-2 instead of each circuit 300-1 of rectifying bridge 4-1. Each circuit 300-2 comprises a first terminal 301, a second terminal 302 and, in this embodiment, a third terminal 303. The circuit 300-2 associated with transistor 208, respectively 209, has its terminal 301 connected to the drain of transistor 208, respectively 209, its terminal 302 connected to the gate of transistor 208, respectively 209, and its terminal 303 connected to node 201, respectively 202.

Each circuit 300-2 comprises a branch comprising a first dipole with a diode function D1 and a second dipole with a diode function D2 coupled together in anti-series.

In this embodiment, in each circuit 300-2, the branch comprising dipoles D1 and D2 in anti-series is connected between terminals 301 and 303 of the circuit. In each circuit 300-2, the branch comprising dipoles D1 and D2 in anti-series further comprises a resistor R4 series-connected to dipoles D1 and D2. Each circuit 300-2 further comprises a transistor T having a control terminal connected to a terminal 502 of resistor R4, having a conduction terminal 503 coupled to terminal 301 of circuit 300-2, and having another conduction terminal 504 coupled to terminal 302 of circuit 300-2. Each circuit 300-2 is configured so that a voltage drop in its resistor R4 conditions a turning-on of its transistor T.

According to an embodiment, as illustrated in FIG. 5, in each circuit 300-2, transistor T is a P-channel MOS transistor having its source 503 coupled to the terminal 301 of circuit 300-2, and its drain 504 coupled to the terminal 302 of the circuit. The terminal of resistor R4 opposite to terminal 502 is then connected to the terminal 503 of transistor T. Preferably, the body region of transistor T is coupled to the source of transistor T, so that the body and source regions of transistor T are at the same potential. According to an alternative embodiment, not illustrated, in each circuit 300-2, transistor T is replaced with a PNP bipolar transistor having its base forming a control terminal of the transistor and connected to terminal 502 of resistor R4, having its emitter 503 coupled to the terminal 301 of circuit 300-2, and having its collector 505 coupled to the terminal 302 of circuit 300-2. In this variation, the terminal of resistor R4 opposite to terminal 502 is then connected to the emitter 503 of the transistor.

According to an embodiment, as illustrated in FIG. 5, in each circuit 300-2, the terminal 503 of transistor T is connected to the terminal 301 of circuit 300-2, and dipole D2 is connected between the terminal 503 of transistor T and the terminal 303 of circuit 300-2, for example, with its cathode on the side of terminal 303 of the circuit, for example, connected to terminal 303. Circuit 300-2 then further comprises a dipole with a diode function D3 series-connected to transistor T, between terminal 503 of transistor T and terminal 302, preferably between the terminal 504 of transistor T and the terminal 302 of circuit 300-2, the cathode of dipole D3 for example being connected to terminal 302 of circuit 300-2. Dipole D3 is configured to block a current between terminals 301 and 302 of circuit 300-2 when the voltage between the terminal 301 of circuit 300-2 and the terminal 301 of the other circuit 300-2 is smaller than the threshold of this circuit. In other words, dipole D3 is configured to block the current between the terminals 301 and 302 of circuit 300-2 when the bridge is in normal operation, that is, particularly, when the potential on terminal 302 is greater than the potential on the terminal 301 of this circuit.

The normal operation of bridge 4-2 is similar to that of the previously-described bridge 4 (FIG. 3). In particular, in each circuit 300-2, no current flows through the dipoles D1, D2, and D3 of circuit 300-2, whereby no current flows between the terminal 301 of circuit 300-2 and each of the terminals 302 and 303 of the circuit.

The operation of bridge 4-2 during an overvoltage between nodes 201 and 202 is the following. The case of a positive overvoltage is considered as an example. As in normal operation, the circuit 300-2 associated with transistor 209 is equivalent to an open circuit between its terminals 301 and 302, and transistor 209 is on. Further, as soon as the voltage between node 202 and node 201 becomes greater than the threshold of the circuit 300-2 associated with transistor 208, a current flows through the circuit dipoles D1 and D2, and thus through resistor R4. As soon as the voltage drop in resistor R4 is greater than the threshold voltage of transistor T, the latter switches to the on state and a current flows between the terminals 301 and 302 of the circuit, and thus through resistor R4. As a result, the gate potential of transistor 208 increases with the potential of node 202. In other words, the potential on the gate of transistor 208 is then equal to the potential of node 202 minus the voltage drop between the terminals 503 and 504 of transistor T and the voltage drop in dipole D3. In the example of FIG. 5, the threshold of each circuit 300 is equal to the sum of the reverse turn-on threshold of dipole D1, of the forward turn-on threshold of dipole D2, and of the threshold voltage of transistor T.

As an example, the case where dipoles D2 and D3 have a forward turn-on threshold equal to 0.6 V and dipole D1 has a reverse turn-on threshold equal to 5 V is considered. In this case, when a current flows from terminal 301 to terminal 302 due to the fact that the voltage between terminals 301 and 303 (referenced to terminal 303) is greater than the threshold of circuit 300-2, the voltage on the gate of transistor T may at most be equal to 5.6 V, that is, the sum of the forward turn-on threshold of dipole D2 and of the reverse turn-on threshold of dipole D1. Resistor R4 then withstands the difference between the voltage on the gate of transistor T and the voltage on terminal 301. Once transistor T is on, the voltage drop between terminals 301 and 302 is equal to the forward turn-on threshold of dipole D3, neglecting the voltage drop between the conduction terminals of transistor T. Thus, the voltage on terminal 302 is then equal to the voltage on node 202 minus the 0.6 V in D3, and may be equal to 6.4 V when the voltage on node 202 is 7 V. By using such examples of numerical values in the case of FIG. 4, the voltage on terminal 302 of the circuit is at most equal to the voltage on node 202 minus the sum of the forward turn-on threshold of D2, of the reverse turn-on threshold of D1, and of the turn-on threshold of transistor T, for example, equal to 0.7 V, which results in a voltage on terminal 302 equal to 0.7 V and much smaller than that of the case of FIG. 5.

The operation of bridge 4-2 in case of a negative overvoltage between nodes 201 and 202 can be deduced, by symmetry, from the operation described hereinabove in case of a positive overvoltage.

In an alternative embodiment, not illustrated, in each circuit 300-2, dipole D2 is connected between the terminal 301 of circuit 300-2 and the terminal 503 of transistor T, for example, with the anode of dipole D2 connected to terminal 301. In this variant, the terminal 504 of transistor T is connected to the terminal 302 of circuit 300-2. Further, in this variation, dipole D3 may be omitted, its current blocking function being ensured by dipole D2. However, in the present variant, it may be useful to modify the connection of the body region of transistor T to avoid, in normal operation, when the potential of terminal 302 is greater than the potential of terminal 301, for the drain-body diode of transistor T to be forward conductive and to possibly turn on the NPN bipolar transistor of transistor T having its emitter corresponding to the drain of transistor T, its base corresponding to an N-type well having transistor T formed therein and its collector corresponding to the P-type substrate having the N-type well formed therein. For example, it may then be provided for transistor T to be associated with two MOS transistors cross-connected between the source and the drain of transistor T, to ensure that the N well of transistor T is at the lower of the two source and drain potentials of transistor T.

It will be within the abilities of those skilled in the art to describe the operation of bridge 4-2 according to this variation, based on the above-described operation.

An advantage of the above-described embodiments and variants of circuit 300-2 over a circuit 300-1 is that it enables, once its transistor T is on, to decrease the voltage drop between its terminals 301 and 302. As a result, the potential on the gate of the transistor 208 or 209 associated therewith it higher.

Although this is not shown in FIG. 5, a frequency compensation capacitor may be provided in parallel with dipole D1 and/or a frequency compensation capacitor may be provided in parallel with transistor T. Such capacitors allow a faster response of circuit 300-2 in case of an overvoltage. However, the value of each of these capacitors is preferably selected to be relatively low, for example, lower than 1 pF, to avoid disturbing the operation of bridge 4-2 in the absence of an overvoltage between pads 101 and 102.

Figure 6:
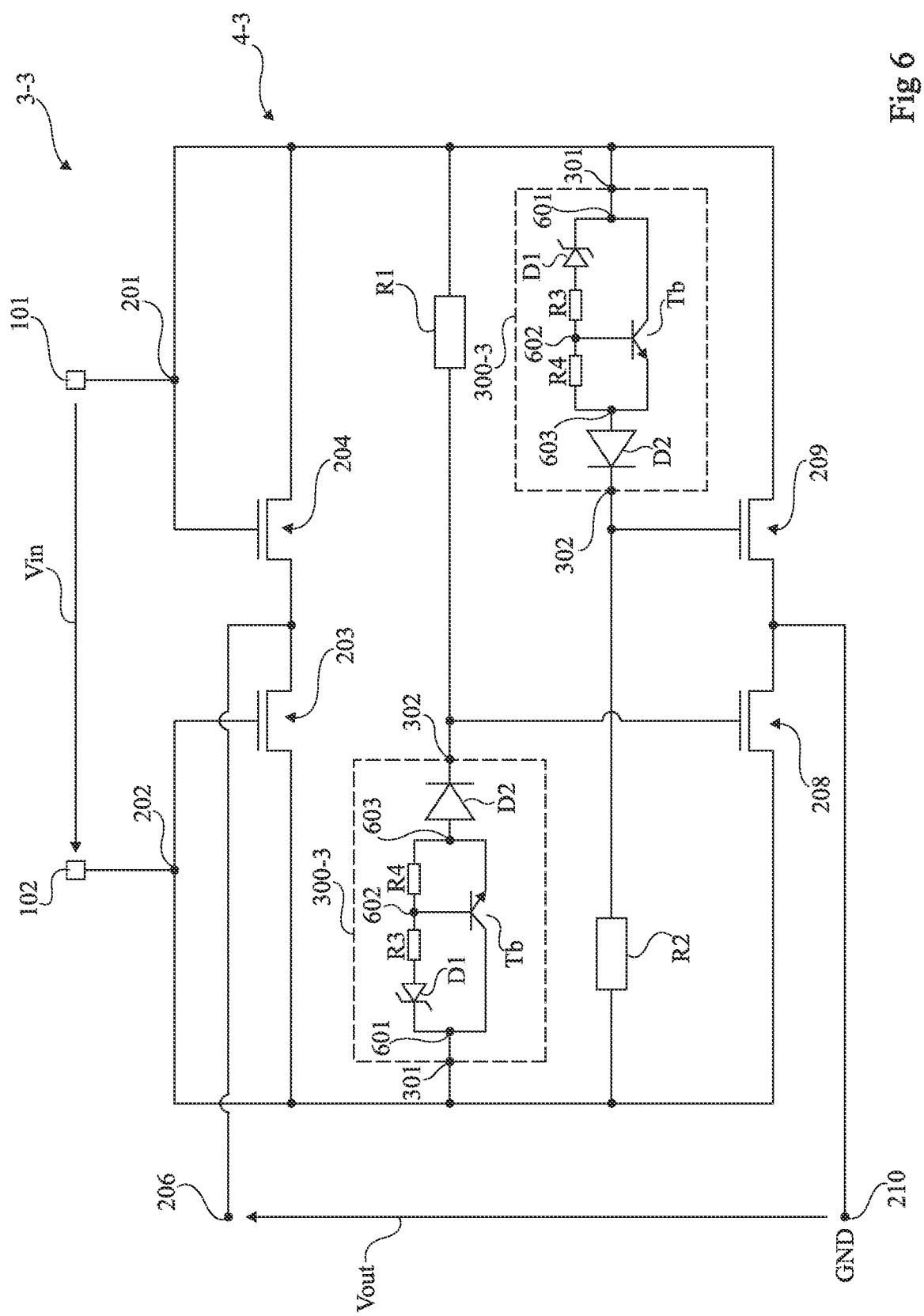
FIG. 6 illustrates, in the form of a circuit, a portion of a device comprising a rectifying bridge according to still another embodiment.

FIG. 6 illustrates, in the form of a circuit, a portion of a device 3-3 comprising a rectifying bridge 4-3 according to still another embodiment.

Device 3-3 is similar to the device 3-1 of FIG. 4, only the differences between devices 3-3 and 3-1 being here detailed. More particularly, device 3-3 differs from device 3-1 by its voltage rectifying bridge 4-3, rectifying bridge 4-3 comprising a turn-on circuit 300-3 instead of each circuit 300-1 of rectifying bridge 4-1. Each circuit 300-3 comprises a first terminal 301 and a second terminal 302. The circuit 300-3 associated with transistor 208, respectively 209, has its terminal 301 connected to the drain of transistor 208, respectively 209, and it terminal 302 connected to the gate of transistor 208, respectively 209.

Each circuit 300-3 comprises a branch comprising a first dipole with a diode function D1 and a second dipole with a diode function D2 coupled together in anti-series.

In this embodiment, in each circuit 300-3, the branch comprising dipoles D1 and D2 in anti-series is connected between the terminals 301 and 302 of the circuit. In each circuit 300-3, the branch comprising dipoles D1 and D2 in anti-series further comprises a resistor R3 series-connected to the first dipole D1 between a node 601 and a node 602 and a resistor R4 connected between node 602 and a node 603. Each circuit 300-3 further comprises a transistor Tb having a control terminal connected to node 602 and having conduction terminals respectively connected to nodes 601 and 603. Each circuit is configured so that a voltage drop in its resistor R4 conditions a turning-on of its transistor Tb.

According to an embodiment, as illustrated in FIG. 6, in each circuit 300-3, transistor Tb is an NPN bipolar transistor, the emitter and the collector of transistor Tb then being coupled, preferably connected, respectively to nodes 603 and 601. In an alternative embodiment, not illustrated, in each circuit 300-3, bipolar transistor Tb is replaced with an N-channel MOS transistor having its gate forming a control terminal of the transistor connected to node 602, having its source connected to node 603, and having its drain connected to node 601. Preferably, the body region of the MOS transistor is then coupled to the source of the transistor, so that the body and source regions of the transistor are at the same potential.

According to an embodiment, as illustrated in FIG. 6, in each circuit 300-3, dipole D2 is connected between node 603 and the terminal 302 of circuit 300-2, the cathode of dipole D2 being for example connected to the terminal 302 of circuit 300-1. In an alternative embodiment, not illustrated, in each circuit 300-2, dipole D2 is connected between terminal 301 and the node 601 of circuit 300-3, the anode of dipole D2 being for example connected to the terminal 301 of circuit 300-3.

The normal operation of bridge 4-3 is similar to that of the previously-described bridge 4 (FIG. 3). In particular, in each circuit 300-3, when no current flows through dipoles D1 and D2 of circuit 300-3, the voltage across resistor R4 is zero, and transistor Tb is off. Thus, no current flows between the terminals 301 and 302 of circuits 300-3, nor in resistors R1 and R2.

The operation of bridge 4-3 during an overvoltage between nodes 201 and 202 is the following. The case of a positive overvoltage is considered as an example. As in normal operation, the circuit 300-3 associated with transistor 209 is equivalent to an open circuit between its terminals 301 and 302, and transistor 209 is on. Further, as soon as the voltage between node 202 and node 201 becomes greater than the threshold of the circuit 300-3 associated with transistor 208, a current flows through dipoles D1 and D2 of the circuit and through resistor R4. As soon as the voltage drop in resistor R4 is greater than the threshold voltage of transistor Tb, a current flows between nodes 601 and 603, not only via resistors R3 and R4 and dipole D1, but also via transistor Tb. As a result, as soon as the voltage between node 202 and node 201 becomes greater than the threshold of circuit 300-3, the gate potential of transistor 208 increases with the potential of node 202. In particular, as soon as the transistor Tb of circuit 300-3 is on, the potential on the gate of transistor 208 is then equal to the potential of node 202 minus the threshold voltage of transistor Tb, the voltage drop in resistor R3, and the voltage drop in dipoles D1 and D2 of circuit 300-3.

In the example of FIG. 6-3, the threshold of each circuit 300-3 is equal to the sum of the reverse turn-on threshold of dipole D1 and of the forward turn-on threshold of dipole D2. Further, transistor Tb switches to the on state as soon as the voltage between terminals 301 and 302 of the circuit exceeds the sum of the reverse turn-on threshold of dipole D1, of the forward turn-on threshold of dipole D2, and of the threshold of transistor Tb.

The operation of bridge 4-3 in case of a negative overvoltage between nodes 201 and 202 can be deduced, by symmetry, from the operation described hereinabove in case of a positive overvoltage.

An advantage of a circuit 300-3 over a circuit 300 is that it enables to conduct, once its transistor Tb is on, a more significant current between its terminals 301 and 302, whereby the potential on the gate of the transistor 208 or 209 associated therewith is higher.

Although this is not shown in FIG. 6, in each circuit 300-3, a frequency compensation capacitor may be provided between nodes 601 and 603 and/or a frequency compensation capacitor may be provided between nodes 601 and 602. Such capacitors allow a faster response of circuit 300-3 in case of an overvoltage. However, the value of each of these capacitors is preferably selected to be relatively low, for example, lower than 1 pF, to avoid disturbing the operation of bridge 4-3 in the absence of an overvoltage between pads 101 and 102.

According to an embodiment, the dipoles D1 of the previously-described circuits 300-1, 300-2, and 300-3 are implemented by a single Zener diode.

According to another embodiment, the dipoles D1 of the previously-described circuits 300, 300-1, 300-2, and 300-3 are implemented by means of a plurality of Zener diodes in parallel, which enables to decrease the inner resistance of dipole D1 and thus the voltage drop between its terminals when a current flows therethrough.

According to still another embodiment, the dipoles D1 of the previously-described circuits 300, 300-1, 300-2, and 300-3 are implemented by means of a plurality of MOS transistors in series, each diode-assembled, that is, with its drain and its gate connected together, the transistor drains being on the side of the dipole cathode. This enables to decrease or to more finely adjust the reverse turn-on threshold of dipoles D1, and thus of circuits 300, 300-1, 300-2, and 300-3, at the cost of an increase in the internal resistance of dipoles D1. The dipoles D1 of circuits 300, 300-1, 300-2, and 300-3, and the possible dipole D3 of circuit 300-2 are each implemented by means of a diode or of a diode-assembled MOS transistor.

To protect device 1 against overvoltages, rather than providing circuits 300, 300-1, 300-2, and 300-3, it could have been devised to place an overvoltage protection between each of pads 101 and 102 and node 210 at the ground potential. However, the provision of such protections would have led to a device having a larger surface area than that of devices 3, 3-1, 3-2, and 3-3. Further, such protections would have introduced stray capacitances and resistances on each of pads 101 and 102, which would have disturbed the operation of the rectifying bridge in the absence of an overvoltage.

According to an embodiment where device 3, 3-1, 3-2, or 3-3 comprises a retromodulation MOS transistor connected between its pads 101 and 102, it may be provided for two circuits 300, 300-1, 300-2, or 300-3, respectively, to be associated with the retromodulation transistor, to turn it on when an overvoltage occurs on one or the other of pads 101 and 102. A first one of the two circuits 300, 300-1, 300-2, or 300-3 then has its terminal 301 connected to pad 102, its possible terminal 303 connected to pad 101, and its terminal 302 connected to the gate of the retromodulation transistor and coupled to pad 101 by a resistor. The second one of the two circuits then has its terminal 301 connected to pad 101, its possible terminal 303 connected to pad 102, and its terminal 302 connected to the gate of the retromodulation transistor and coupled to pad 102 by another resistor.

Although this is not claimed herein, two turn-on circuits may be associated with the retromodulation transistor, as described hereinabove, without for transistors 208 and 209 to be each associated with a turn-on circuit.

According to embodiments, not illustrated, the turn-on circuits of a same device 3, 3-1, 3-2, or 3-3 may be different from one another, including when such circuits are associated with the retromodulation transistor. For example, the circuit 300 of the bridge 3 associated with transistor 208 may be replaced with a circuit 300-1, 300-2, or 300-3.

According to an embodiment, rectifying bridge 4, 4-1, 4-2, or 4-3 and pads 101 and 102 of device 3, 3-1, 3-2, or 3-3 respectively belong to a same integrated circuit, the conductive antenna winding being preferably external to the integrated circuit.

Although wireless communication devices 3, 3-1, 3-2, and 3-3, for example, NFC-type (near field communication) devices or devices in accordance with ISO standard 14443 or 15693, have been described herein, rectifying bridges 4, 4-1, 4-2, and 4-3 may be implemented in other devices, to protect circuits of these other devices from possible overvoltages, for example caused by electrostatic discharges, on one or the other of two pads having the respective nodes 201 and 202 of the rectifying bridges coupled thereto.

Further, it will be within the abilities of those skilled in the art to adapt the above disclosure to the case where transistors 208 and 209 have a P channel, for example, by inverting all the N and P types and the values of the previously-described voltages, for example, by replacing each N-channel MOS transistor, respectively, with a P-, respectively N-channel MOS transistor, by replacing each NPN, respectively PNP transistor, with a PNP, respectively NPN, transistor, by replacing a P substrate of the circuit coupled to the lowest potential with an N substrate coupled to the highest potential, etc. In this case, the threshold of a turn-on circuit is negative and is, in absolute value, equal to the threshold of the turn-on circuits described in relation with FIGS. 2 to 6. The voltage between the terminal 301 of this circuit and the terminal 301 of the other turn-on circuit is then called greater than the threshold of the circuit if it has the same sign as the threshold and an absolute value greater than the absolute value of the threshold. In other words, whether transistors 208 and 209 have an N channel or a P channel, a turn-on circuit is configured to electrically couple its terminals 301 and 302 when the voltage between the terminal 301 of this circuit and the terminal 301 of the other circuit has the same sign as the circuit threshold and has an absolute value greater than that of the threshold, and to isolate its terminals 301 and 302 when the voltage between the terminal 301 of the circuit and the terminal 301 of the other turn-on circuit has an absolute value smaller than that of the threshold and, also, when this voltage is has sign opposite to that of the circuit threshold.

Various embodiments and variants have been described. Those skilled in the art will understand that certain features of these embodiments can be combined and other variants will readily occur to those skilled in the art.

Finally, the practical implementation of the described embodiments and variations is within the abilities of those skilled in the art based on the functional indications given hereinabove. In particular, it will be within the abilities of those skilled in the art to select the resistance values, the values of the possible frequency compensation capacitances, the forward turn-on threshold of dipole D2, the forward turn-on threshold of the possible dipole D3, and/or the reverse turn-on threshold of dipole D1 according to the targeted application, that is, according to the maximum voltage capable of being present between nodes 201 and 202 in normal operation (with no overvoltage) and/or to the maximum amplitude of the overvoltages capable of occurring between nodes 201 and 202. As an example, the values of resistances R1 and R2 should be sufficiently low to avoid disturbing the bridge in normal operation by introducing R*C-type propagation delays (C being the capacitance of the gates of transistors 208 and 209), for example, smaller than 10 k$\Omega$, and should be sufficiently high to enable the turn-on circuits to increase the voltage on the gate of transistors 208 and 209, for example, greater than 100$\Omega$, resistances R1 and R2 for example each having a value in the order of 1 k$\Omega$, for example, equal to 1 k.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device comprising a rectifying bridge comprising:
   a first branch connected between first and second input nodes of the bridge and comprising a third output node of the bridge;
   a second branch comprising first and second metal oxide semiconductor (MOS) transistors series-connected between the first and second input nodes, wherein sources of the first and second transistors are coupled to a fourth output node of the bridge;
   a first resistor connected between a gate of the first transistor and the second input node;
   a second resistor connected between a gate of the second transistor and the first input node; and
   for each of the first and second transistors, a circuit associated with the respective transistor comprises a first terminal connected to a drain of the respective transistor and a second terminal connected to the gate of the respective transistor, wherein the circuit is configured to electrically couple its first and second terminals when an absolute value of a voltage between the first terminal of the circuit and the first terminal of the other circuit is greater than or equal to an absolute value of a threshold of the circuit and the voltage has a same sign as the threshold.

2. The device according to claim 1, wherein each circuit is further configured to electrically isolate its first and second terminals when the absolute value of the voltage between the first terminal of the circuit and the first terminal of the other circuit is smaller than the absolute value of the threshold of the circuit and also when the voltage has a sign opposite to the sign of the threshold of the circuit.

3. The device according to claim 1, wherein the first branch of the bridge comprises third and fourth MOS transistors series-connected between the first and second input nodes and each diode-assembled, and sources of the third and fourth transistors are connected to the third output node.

4. The device according to claim 3, wherein the first, second, third, and fourth transistors have a same N- or P-type channel.

5. The device according to claim 1, wherein each circuit comprises a branch comprising a first dipole with a first diode function and a second dipole with a second diode function coupled in anti-series, one end of the branch being connected to the first terminal of the circuit and another end of the branch being coupled to the first terminal of the other circuit.

6. The device according to claim 5, wherein, in each circuit, the first and second dipoles are configured to block a current when the absolute value of the voltage between the first terminal of the circuit and the first terminal of the other circuit is smaller than the absolute value of the threshold of the circuit and when the voltage has a sign opposite to the sign of the threshold of the circuit, and to conduct the current when the absolute value of the voltage between the first terminal of the circuit and the first terminal of the other circuit is greater than or equal to the absolute value of the threshold of the circuit and the voltage has the same sign as the threshold.

7. The device according to claim 6, wherein each circuit is configured so that the conduction of the current in the first dipole of the circuit causes an electric coupling of the first and second terminals of the circuit.

8. The device according to claim 5, wherein, in at least one of the circuits, the another end of the branch of the circuit is connected to the second terminal of the circuit.

9. The device according to claim 8, wherein, in the at least one of the circuits, the branch of the circuit comprises:
fifth, sixth, and seventh nodes;
a third resistor series-connected to the first dipole between the fifth node and the sixth node; and
a fourth resistor connected between the sixth node and the seventh node,
each circuit further comprising a fifth transistor having a control terminal connected to the sixth node and having conduction terminals respectively connected to the fifth node and to the seventh node, a voltage drop in the fourth resistor conditioning a turning-on of the fifth transistor.

10. The device according to claim 9, wherein, in the at least one of the circuits:
the second dipole is connected between the first terminal of the circuit and the fifth node, the seventh node being connected to the second terminal of the circuit; or
the second dipole is connected between the seventh node and the second terminal of the circuit, the fifth node being connected to the first terminal of the circuit; or
the second dipole is connected between the first terminal of the circuit and the seventh node, the fifth node being connected to the second terminal of the circuit; or
the second dipole is connected between the fifth node and the second terminal of the circuit, the seventh node being connected to the first terminal of the circuit.

11. The device according to claim 5, wherein, in at least one of the circuits, the another end of the branch of the circuit is connected to a third terminal of the circuit, the third terminal of the circuit being connected to the first terminal of the other circuit.

12. The device according to claim 11, wherein, in the at least one of the circuits, the branch comprises a third resistor in series with the first and second dipoles, each circuit further comprising a fifth transistor having a control terminal connected to a terminal of the third resistor, having a first conduction terminal coupled to the first terminal of the circuit, and having a second conduction terminal coupled to the second terminal of the circuit, a voltage drop in the third resistor conditioning a turning-on of the fifth transistor.

13. The device according to claim 12, wherein, in the at least one of the circuits, the second dipole is connected between the first terminal of the circuit and the first conduction terminal of the fifth transistor, the second conduction terminal of the fifth transistor being connected to the second terminal of the circuit.

14. The device according to claim 12, wherein at least one of the circuits, further comprises a third dipole with a diode function series-connected to the fifth transistor of the circuit between the first and second terminals of the circuit, the third dipole being connected to the second terminal of the circuit and the branch of the circuit being connected between the first and third terminals of the circuit.

15. The device according to claim 5, wherein the first dipole is a Zener diode, a plurality of Zener diodes connected in parallel, or a plurality of series-connected MOS transistors configured as diodes.

16. An integrated circuit (IC) comprising:
first and second input pads; and
a rectifying bridge comprising:
a first branch connected between first and second input pads of the bridge and comprising a third output node of the bridge;
a second branch comprising first and second metal oxide semiconductor (MOS) transistors series-connected between the first and second input pads, wherein sources of the first and second transistors are coupled to a fourth output node of the bridge;
a first resistor connected between a gate of the first transistor and the second input pad;
a second resistor connected between a gate of the second transistor and the first input pad; and
for each of the first and second transistors, a circuit associated with the respective transistor comprises a first terminal connected to a drain of the respective transistor and a second terminal connected to the gate of the respective transistor, wherein the circuit is configured to electrically couple its first and second terminals when an absolute value of a voltage between the first terminal of the circuit and the first terminal of the other circuit is greater than or equal to an absolute value of a threshold of the circuit and the voltage has a same sign as the threshold.

17. The IC of claim 16, wherein each circuit is further configured to electrically isolate its first and second terminals when the absolute value of the voltage between the first terminal of the circuit and the first terminal of the other circuit is smaller than the absolute value of the threshold of the circuit and also when the voltage has a sign opposite to the sign of the threshold of the circuit.

18. The IC of claim 16, wherein the first branch of the bridge comprises third and fourth MOS transistors series-connected between the first and second input nodes and each diode-assembled, and sources of the third and fourth transistors are connected to the third output node.

19. The IC of claim 16, wherein each circuit comprises a branch comprising a first dipole with a first diode function and a second dipole with a second diode function coupled in anti-series, one end of the branch being connected to the first terminal of the circuit and another end of the branch being coupled to the first terminal of the other circuit.

20. The IC of claim 16, wherein the first and second pads are configured to be coupled to respective ends of a conductive winding of an antenna.

* * * * *